A. A. MERRITT.
SPEED GOVERNED STOPPING MECHANISM.
APPLICATION FILED OCT. 12, 1910.
1,156,916.
Patented Oct. 19, 1915.
6 SHEETS—SHEET 3.
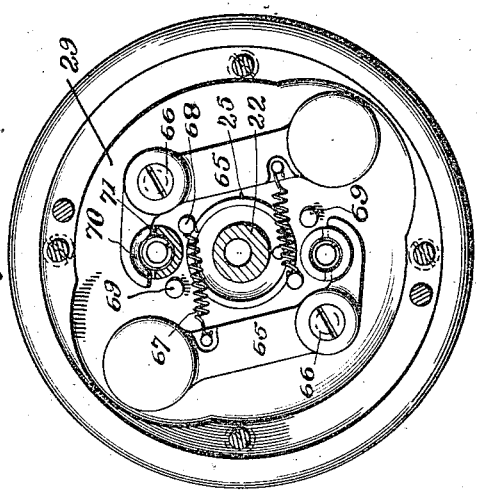
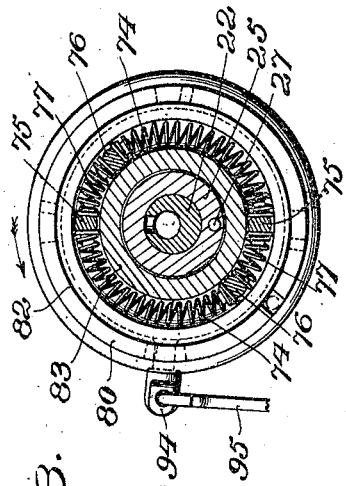
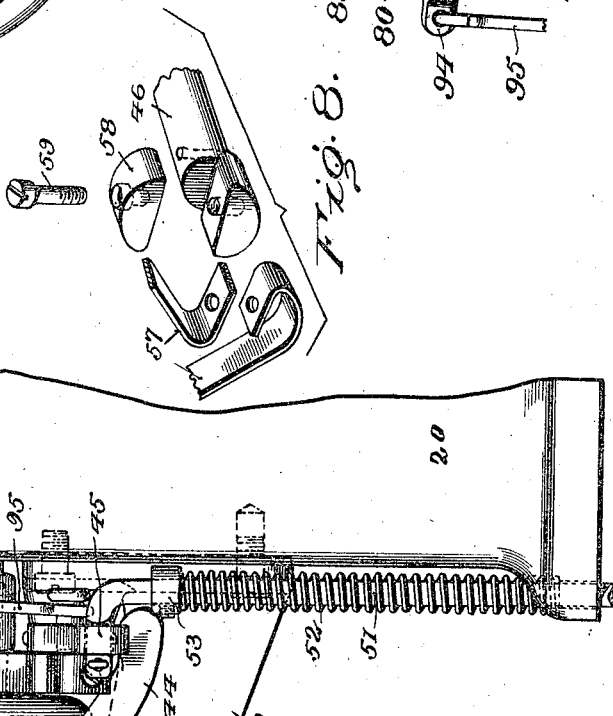

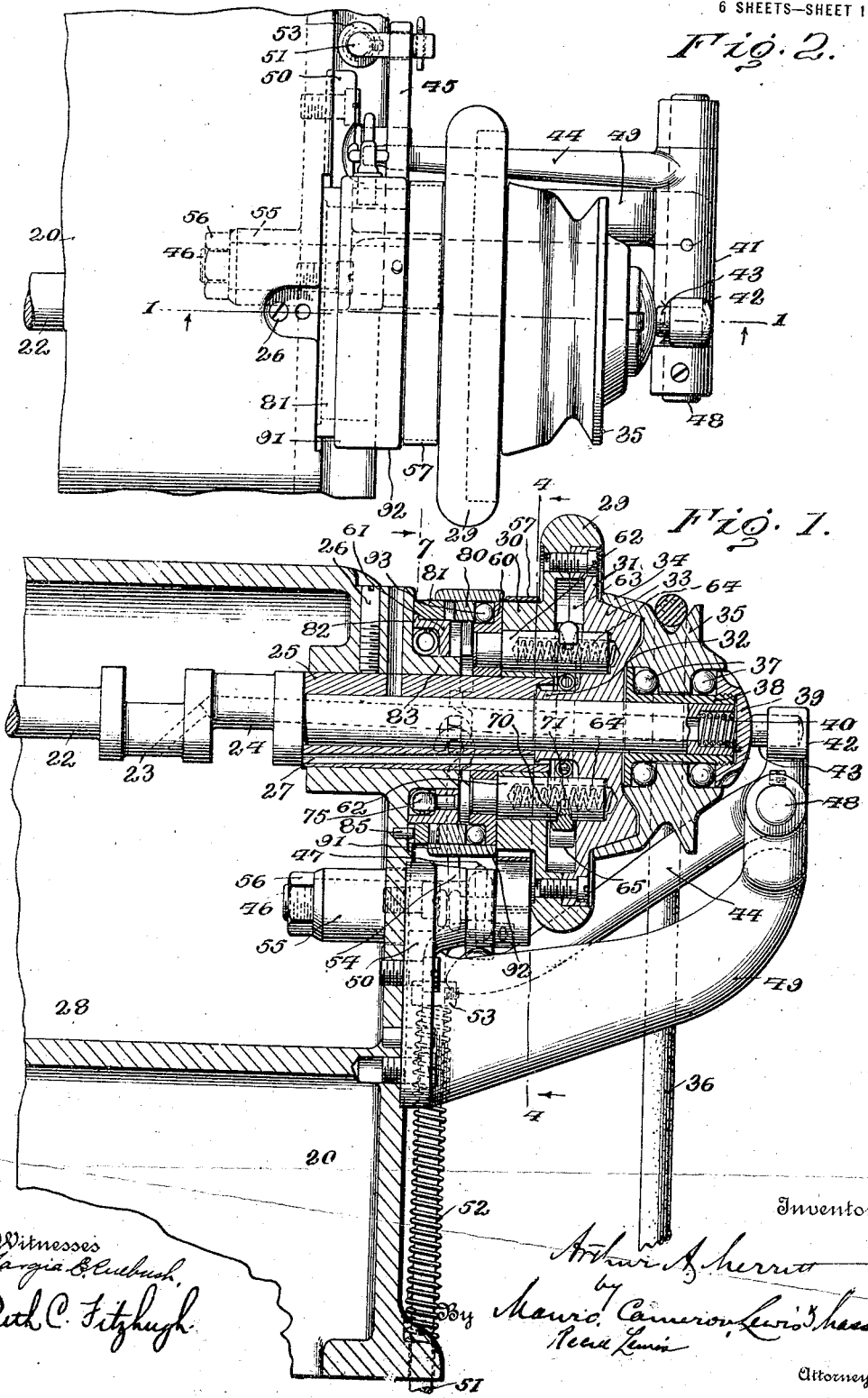

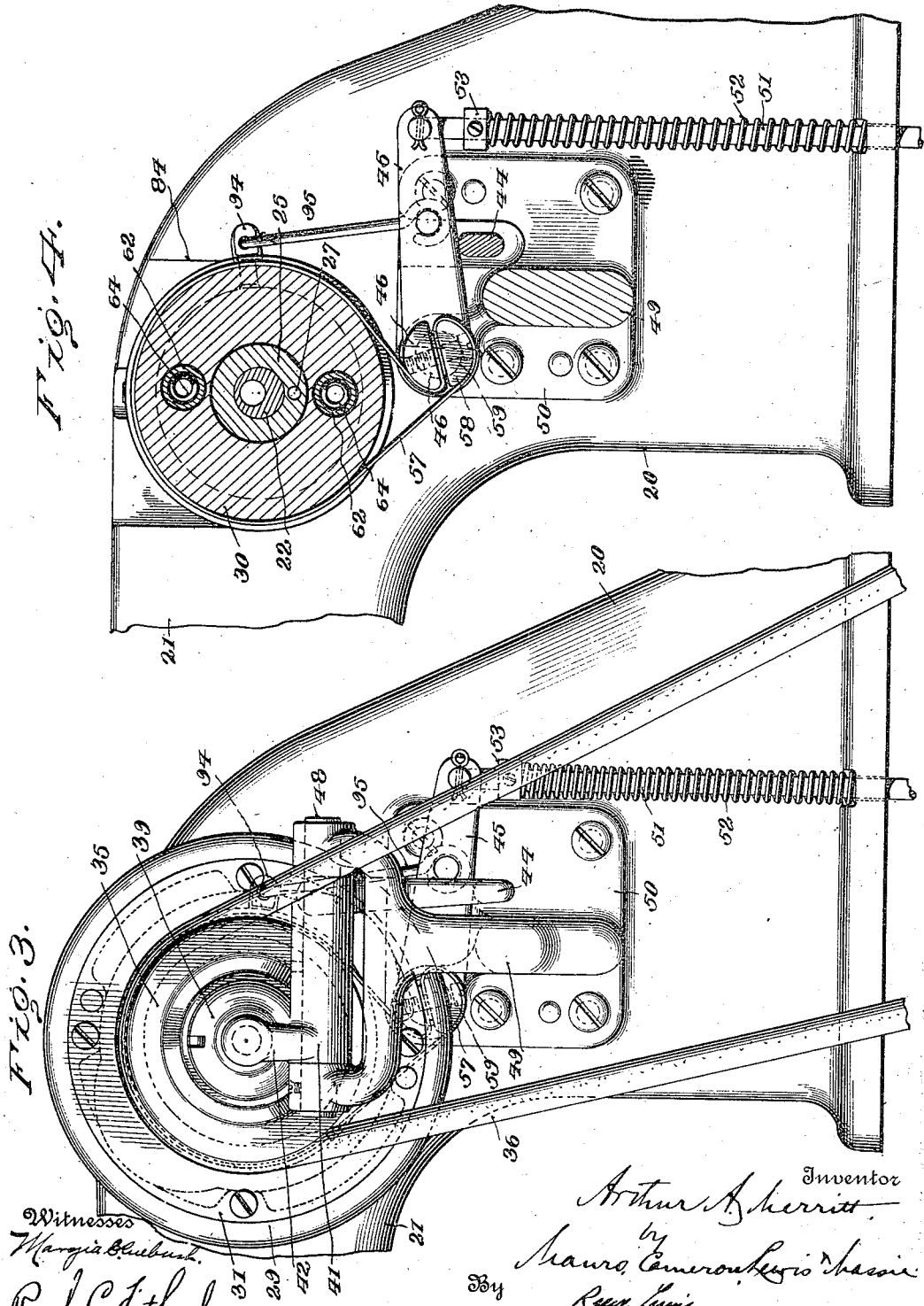

A. A. MERRITT.
SPEED GOVERNED STOPPING MECHANISM.
APPLICATION FILED OCT. 12, 1910.
1,156,916.
Patented Oct. 19, 1915.
6 SHEETS—SHEET 4.
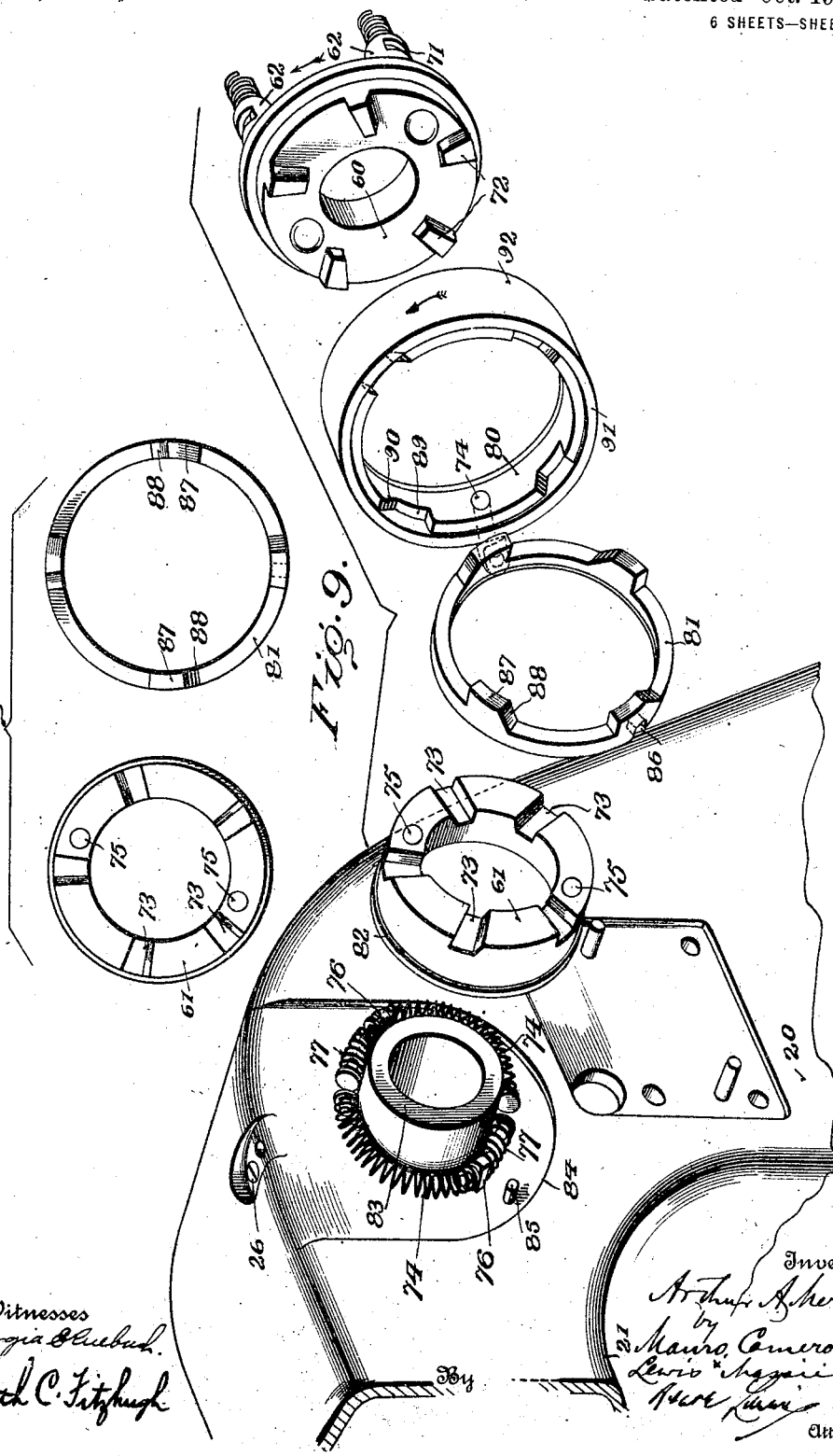

A. A. MERRITT.
SPEED GOVERNED STOPPING MECHANISM.
APPLICATION FILED OCT. 12, 1910.
1,156,916.
Patented Oct. 19, 1915.
6 SHEETS—SHEET 5.
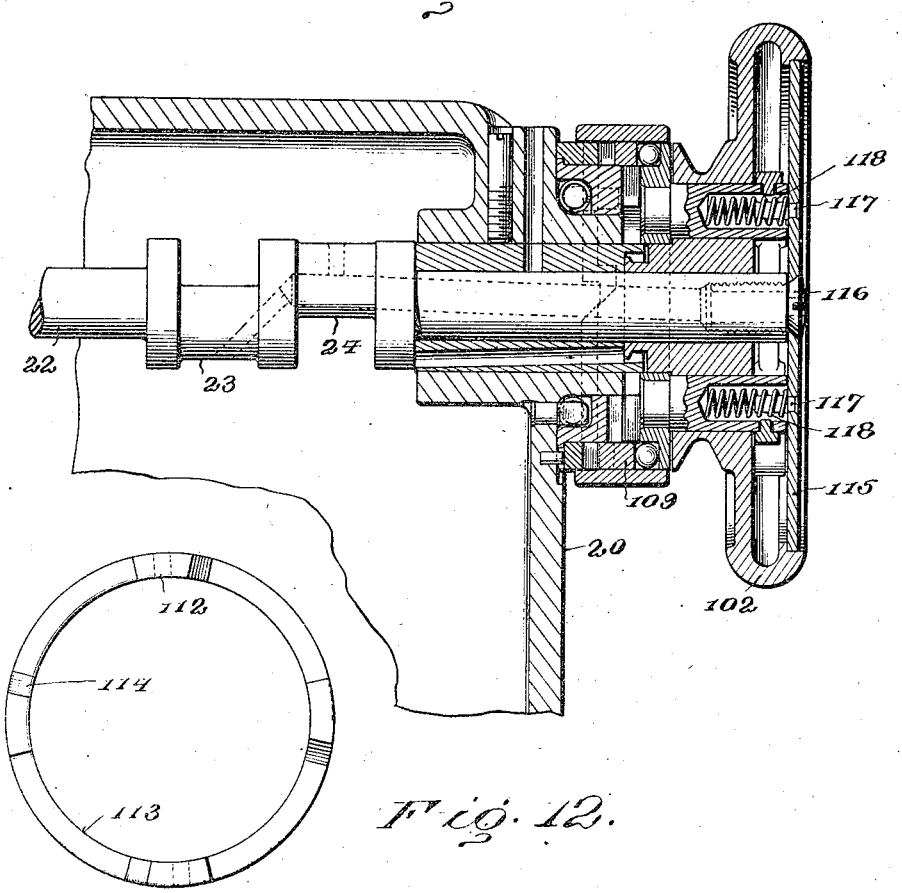
Fig. 11.
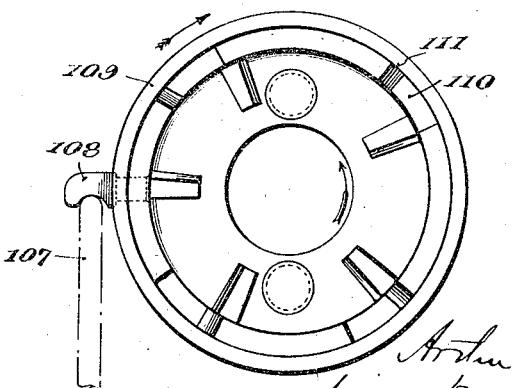
Fig. 12.
Fig. 15.
Witnesses
Margie Bluebush
Ruth C Fitzhugh
Inventor
Arthur A. Merritt
by
Mauro, Cameron Lewis & Massie
Reeve Lewis
Attorneys A. A. MERRITT.
SPEED GOVERNED STOPPING MECHANISM.
APPLICATION FILED OCT. 12, 1910.

1,156,916. Patented Oct. 19, 1915.
6 SHEETS—SHEET 6.

UNITED STATES PATENT OFFICE.

ARTHUR A. MERRITT, OF WORCESTER, MASSACHUSETTS, ASSIGNOR TO WILLCOX & GIBBS SEWING MACHINE CO., OF NEW YORK, N. Y., A CORPORATION OF NEW YORK.

SPEED-GOVERNED STOPPING MECHANISM.

1,156,916.   Specification of Letters Patent.   Patented Oct. 19, 1915.

Application filed October 12, 1910. Serial No. 586,687.

*To all whom it may concern:*

Be it known that I, ARTHUR A. MERRITT, of Worcester, Massachusetts, have invented a new and useful Improvement in Speed-Governed Stopping Mechanism, which invention is fully set forth in the following specification.

This invention relates to mechanism for stopping sewing-machines with the main-shaft arrested in such position as to leave the needles in their highest position and other stitch-forming elements including the feed surfaces, in position to permit withdrawal of a garment or work that has been sewed and the free introduction of a garment or work to be sewed. In the use of sewing-machines not equipped with stopping mechanism for thus arresting the parts in predetermined positions, it is almost invariably necessary, after the machine has stopped, for the operator to turn the machine by hand until the parts are in the position desired. Modern power-driven sewing-machines are run at very high speed, such, for example, as three thousand (3,000) revolutions of the main-shaft per minute. Damaging shocks would result if the stopping mechanism went into action at such high speed.

The particular objects of my present invention are to provide a highly efficient mechanism for accurately bringing a sewing-machine to a stop with its needles and other parts in a predetermined position and to make such mechanism automatically self-controlling, whereby it cannot operate until the sewing-machine has attained a relatively low speed, such as an approximate minimum of six hundred (600) or eight hundred (800) revolutions of the main-shaft per minute. These and other objects and advantages are attained by my invention, preferred embodiments of which are illustrated in the accompanying drawings, wherein—

Figure 13:
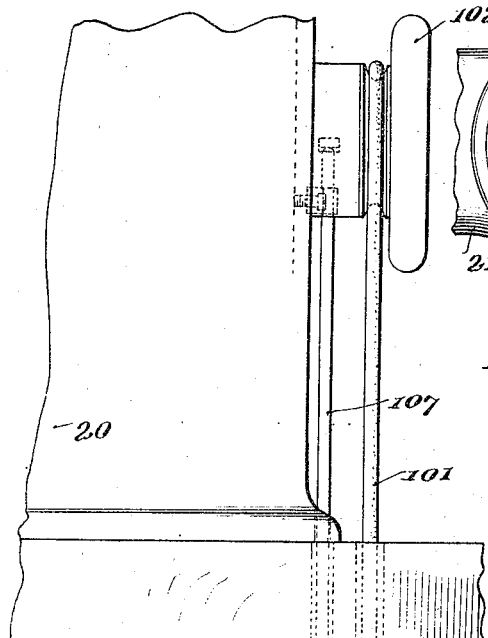

Figure 1 is a vertical sectional view through the mechanism, on line 1—1 of Fig. 2, with some parts in elevation—the parts are in positions assumed when the machine is running at high speed; Fig. 2 is a top plan view; Fig. 3 is an end elevation from the right of Figs 1 and 2; Fig. 4 is a view, partly in end elevation and partly in section, on line 4—4 of Fig. 1; Fig. 5 is a rear elevation of the mechanism; Fig. 6 is an elevation of the hand-wheel with part thereof removed to show the governor weight levers, said levers being shown in the position to which they are moved by centrifugal force when the machine is operating at high speed; Fig. 7 is a sectional view on line 7 of Fig. 1; Fig. 8 is a detail view in perspective with parts separated, illustrating the manner of fastening the ends of the brake-band to the end of a rotating stud which tightens said band; Fig. 9 illustrates in perspective various parts of the mechanism detached and separated; Fig. 10 shows in elevation one of the clutch rings and one of the clutch shifting or starting rings; Fig. 11 is a vertical sectional view illustrating another embodiment of the invention; Fig. 12 is a face view of one of the clutch rings and one of the clutch shifting rings of the mechanism of Fig. 11; Fig. 13 is a front elevation, and Fig. 14 an end elevation, illustrating the use of a suitable form of power-transmitting mechanism in conjunction with the mechanism of Fig. 11; and Fig. 15 is a detail view of one of the clutch shifting rings of the mechanism of Fig. 11.

In the drawings, I have illustrated my present invention as being applied to a sewing-machine of the type shown in my application for patent filed December 12, 1908, Serial No. 467,163. Only a small portion of such machine is, however, illustrated, 20 being a hollow standard at one end of the machine frame, and 21 being a part of the upper horizontal portion of the hollow work-arm which is preferably formed as a continuation of the hollow standard 20.

22 is the main-shaft having a crank 23, from which the feeding mechanism is actuated, and a crank 24 from which the looper mechanism is actuated.

I will first describe the embodiment of the invention illustrated in Figs. 1 to 10. 25 is a bushing or bearing for the right-hand end of the main-shaft 22, held in place by a set screw 26 and having therethrough a longitudinal slightly inclined passage 27 for draining lubricant from a recess in the outer end of the bushing back into the lubricant collecting reservoir or chamber 28 (Fig. 1). The hand-wheel is formed in two parts, one part 29 having a hub 30 around the outer end of bushing 25 and the other part 31 fitting in and being secured to the part 29 by screws and also being fastened to the main-shaft 22 in any suitable way, as by a set screw not shown. Between the parts there is a chamber 63. The part 31 has a flange 32, projecting inwardly about shaft 22 into the recess in the outer end of the bushing 25, and also has an outwardly projecting hub or enlargement 33 formed with a frustro-conical friction surface adapted to be engaged by the counter part interior surface of a flange 34 on the inner end of a driving pulley 35 actuated by a belt 36 from a suitable source of power. Pulley 35 runs on ball-bearings 37, 37 interposed between it and a sleeve 38, which latter is free to move longitudinally on the outer end of main-shaft 22. A cap 39, screw-threaded on to the outer end of sleeve 38, holds the sleeve, bearing-balls and pulley in proper relationship, and also covers the outer end of the main-shaft 22. A spring 40, located in a recess at the outer end of the main-shaft and bearing against the inner face of the cap 39, tends to shift the pulley to a position out of frictional contact with the frustro-conical surface of the hub 33 of the hand-wheel. For forcing the pulley and hand-wheel into frictional engagement against the tension of this spring, there is provided a rotatable sleeve 41 having an upwardly projecting arm 42 having set in a socket therein a plug of wood, leather or the like, which contacts with the cap 39 heretofore mentioned. Sleeve 41 has also an obliquely depending arm 44, the lower end of which terminates beneath the lever 45 fulcrumed on a short shaft 46, more fully described presently. A pin 47 passes through the lever and the shaft to fasten the same together. The sleeve 41 is supported by and rotatable on a short shaft 48, which latter extends between and is supported by arms of a bracket 49, the plate 50 of which bracket fits in a shallow recess of the outer surface of the end wall of the standard 20 of the machine and is fastened in place by screws illustrated. The rear end of lever 45 is engaged by the upper bent end of a rod 51 which depends through an opening in the flange at the base of standard 20, for suitable connection to an operating treadle or other means, not shown. A spring 52 surrounding rod 51 bears at its upper end against a collar 53 fixed to said rod and at its lower end in a recess in the flange on standard 20. The tension of this spring tends to normally hold the lever 45 elevated and the arm 44 free of downward pressure from said lever, the tension of spring 40 under these conditions being sufficient to hold the pulley 35 out of frictional driving engagement with the hand-wheel. When, however, the operator actuates the treadle or other suitable means for moving rod 51 downward against the tension of spring 52, the resulting downward swinging of lever 45 acts through arm 44, sleeve 41, arm 42 and plug 43 to move the pulley 35 toward the left into frictional driving engagement with the hand-wheel.

The short shaft 46, before mentioned, extends from the lever 45 through a bearing opening in a boss 54 on the bracket plate 50 which extends through an opening in the wall of the standard 20; a nut 56 on the inner end of the shaft holds it in place. Speed-retarding means are provided in the form of a brake-band 57, preferably of metal, looped about and bearing upon the outer cylindrical surface of the hub 30 of the hand-wheel, the ends of said band being overlapped and secured to the outer extremities of the shaft 46 by means of a block 58 and a screw 59, as most clearly shown in Figs. 4 and 8. When the machine is out of operation or stopped, at which time there is no downward pull upon the rod 51, the spring 52 lifts the lever 45 to the position shown in Fig. 4, thereby turning the shaft 46 to position to tighten the brake-band 57 against its coacting surface to retard rotation of the hand-wheel, the main shaft 22 to which the latter is fixed, and parts driven from said shaft. When the treadle or other suitable means are operated to throw the machine into operation, the downward pull upon rod 51 swings lever 45 to the position illustrated in Fig. 3, thereby releasing the grip of the brake-band 57 upon its coacting surface.

The stopping of the machine is effected by the engagement of a pair of stopping or clutch rings; one of these rings 60 is rotatable with the hand-wheel and the other ring 61 surrounds a boss 83 on the wall of standard 20 and is relatively fixed except for limited rotation permitted by buffer springs described later. The ring 60 encircles the bushing 25 contiguous to the inner face of the hub 30 and carries two studs 62, 62 riveted at one end through the ring and longitudinally movable in cylindrical openings in the hubs 30 and 33 of the hand-wheel, said openings and the studs extending parallel to the main shaft 22. These studs also pass through the chamber 63 of the hand-wheel. Springs 64, 64, located in the hollow ends of studs 62, 62, respectively, tend to force said studs and with them the clutch ring 60 toward the left in Fig. 1 to engage said clutch ring with the relatively fixed clutch ring 61. But until the speed of the machine has been sufficiently retarded, this action of the springs 64, 64 is prevented by two centrifugally-operated weight levers 65, 65 which engage and lock the studs 62, and hence the clutch ring 60, against such movement in a manner which will now be described. The two levers 65 are similar in construction.
They are each located in the chamber 63 of the hand-wheel and fulcrumed on a screw-stud 66. The long arm of each lever has a head or enlargement at its outer end to constitute a weight and is connected by a spring 67 to a stud 68. The spring 67 tends to swing the weighted end of the lever inward toward the axis of rotation, such movement being limited by a stop stud 69. The shorter arm of each lever 65 has a lip 70 adapted to engage the notch 71 of its corresponding stud 62 to thereby lock said stud against longitudinal movement. When the machine is running at full speed, or at greater speed than would safely permit of its being stopped, centrifugal action swings the weight levers 65 (which rotate with the hand-wheel) outward against the tension of springs 67, 67, to the positions indicated in Figs. 1 and 6, thereby engaging the lips 70 of the levers with the notches 71 in studs 62, and thus locking the clutch rings 60 against movement by springs 64. On its inner or left-hand face, the clutch ring 60 has five irregularly-spaced teeth 72 adapted to engage respectively the five similarly irregularly-spaced notches 73 in the relatively-fixed clutch ring 61, this arrangement of teeth and notches being such that the two clutch rings will only make clutching engagement in one relative position, and each particular tooth 72 will always engage its particular notch 73. When, therefore, the speed of the machine is sufficiently reduced to permit the springs 67 to swing the levers 65 to position to release the studs 62 and hence the clutch ring 60, the latter will be moved toward the left, its teeth 72 making engagement with their notches 73, respectively, of the relatively-fixed clutch rings 61, thereby stopping the main-shaft in such position that the needles will be at the highest point of their movement and the other stitch-forming elements in position to permit insertion and withdrawal of work.
To avoid jarring and injury that might likely result if the mechanism, even when running at relatively low speed, were brought to a dead stop by the engagement of the clutch rings, the relatively-fixed clutch ring 61 is permitted a limited movement against suitable buffer springs 74, 74, each interposed between a stud 75 fixed to the ring 61 and a stud 76 fixed to the end wall of the standard 20 of the machine. When the clutch rings are engaged, the ring 61 is rotated a short distance against the tension of the springs 74 until finally stopped. Springs 74 thus compressed react to give a slight reverse rotation which is arrested without jarring by shorter springs 77, each interposed between studs 75 and 76, as clearly shown in Fig. 7. These springs and the projecting ends of the studs which coöperate therewith, are located in a groove or recess about the inner edge of the ring 61, as clearly shown in Fig. 1. In each end of each of the springs, there is fixed a flat head for contacting with the flattened side of one of the studs.

In starting the mechanism after it has been stopped by engagement of the clutch rings above described, the movable clutch ring 60 must be shifted toward the right, Fig. 1, against the tension of springs 64, to disengage its teeth 72 from the notches 73 of the relatively fixed clutch ring 61. This is accomplished by a pair of starting cam rings, one of these rings 80, which may be termed the shifter-ring, being rotatable and also movable in a direction parallel to the axis of the main shaft 22, and the other ring 81 being fixed. Fixed ring 81 loosely encircles the relatively fixed clutch ring 61 and has in its outer edge a groove in which a flange 82 at the inner edge of the ring 61 fits. The rings 61 and 81 thus fitted together, and the springs 74 and 77 within the ring 61, encircle the boss 83, before mentioned, and rest in a slight depression or recess 84 in the exterior surface of said wall (see Fig. 9) about the boss 83. A pin or stud 85 projects from the wall of the arm 20 into a notch 86 of the cam ring 81, thereby fixing the latter against rotation. Ring 81 has four equidistant teeth 87, each having an inclined or cam edge 88, which teeth are adapted to engage four equidistant notches 89 in the ring 80, each of said notches having an inclined or cam edge 90. The cam ring 80 has at one side a projecting lip or flange 91, which surrounds and overlaps the ring 81, thereby covering and inclosing the teeth 87 and the notches 89. Ring 80 also has a projecting flange 92 at its other edge which surrounds and overlaps clutch ring 60 and incloses anti-friction bearing-balls 93 interposed between the clutch ring 60 and the cam ring 80 in a groove about the edge of the former. For rotating the cam ring 80, the lug 94 projecting therefrom is connected by link 95 to the lever 45.

When the machine is stopped, the lever 45 stands in the position illustrated in Fig. 4, to which position it is raised by the spring 52 when downward pull upon the rod 51 is released by the operator removing his foot from the treadle. The teeth 87 of cam ring 81 also stand in engagement with the notches 89 of the cam ring 80; likewise, the teeth and notches of the clutch rings 60 and 61 are in interlocking engagement. When the treadle or other means is actuated to throw the machine into operation, the lever 45 is moved downward to the position shown in Fig. 3, and, through the link 95, rotates the cam ring 80 in the direction of the arrow placed on said ring in Fig. 9, thereby causing the inclined edges 90 of the notches 89 to act against the inclined edges 88 of the teeth 87 on ring 81, and shift the cam ring 80, and with it the clutch ring 60 and the studs 62 on the latter, toward the right to the position in which these parts are indicated in Fig. 1, this movement being in opposition to the tension of the springs 64, 64. This movement of the clutch ring 60 disengages its teeth 72 from the notches 73 in clutch ring 61, leaving the hand-wheel and the main-shaft, to which it is secured, free to be rotated by the pulley 35. This disengagement of the clutch rings, and also the loosening of the brake-band 57, is so timed as to take place just before the pulley 35 makes frictional gripping engagement with the hand-wheel. So long as the lever 45 and the cam ring 80 remain in the position shown in Fig. 3, due to continued pressure of the operator's foot upon the treadle, the cam ring 80 will remain shifted to the position shown in Fig. 1, thus holding the clutch ring 60 out of engagement with the clutch ring 61, irrespective of the speed at which the machine is running. With the clutch ring 60 in this position, its studs 62 are in such position as to present their notches 71 in position to be engaged by the lips 70 of the levers 65 so long as the speed of rotation is sufficiently high to cause said levers to be held by centrifugal force in the position shown in Fig. 6 against the opposing tension of springs 67.

With the machine running at a high rate of speed, the parts stand in positions indicated in Figs. 1 and 3. To stop the machine the operator releases pressure upon the treadle, and the spring 52 elevates the lever to the position shown in Fig. 4, rotating the cam ring 80 (in a direction the reverse of the arrow thereon in Fig. 9) to a position bringing its notches 89 opposite the teeth 87 on the cam ring 81; and at the same time tightening the brake-band 57 to retard the rotation. The clutch ring 60, however, remains locked in the position shown in Fig. 1, by engagement of the levers 65 with the notches in the studs 62 until the speed of rotation has sufficiently reduced (to say eight hundred (800) or six hundred (600) revolutions per minute of the main-shaft) to permit the springs 67 to overcome centrifugal force and swing the levers 65 against their stops 69, thereby disengaging the lips 70 of the levers from the notches 71 in the studs. The mechanism is so constructed that this unlocking of the clutch ring 60 cannot take place until the speed of rotation has been reduced to a point where the mechanism may be safely stopped by engagement of the clutch rings without danger of injury to the parts. As soon as the levers 65 clear the notches 71 in the studs 62, the springs 64 shift the clutch ring 60 toward the left in Fig. 1 into engagement with the relatively-fixed clutch ring 61. Incidentally, the cam ring 80 is also shifted toward the left, its notches 89 engaging over the teeth 87 of the cam ring 81. The buffer springs 74 permit slight rotation of the relatively-fixed clutch ring 61, to avoid shock or jar, as previously explained, and the mechanism is brought to a stop with the needles and other parts in the predetermined position desired.

Figure 14:
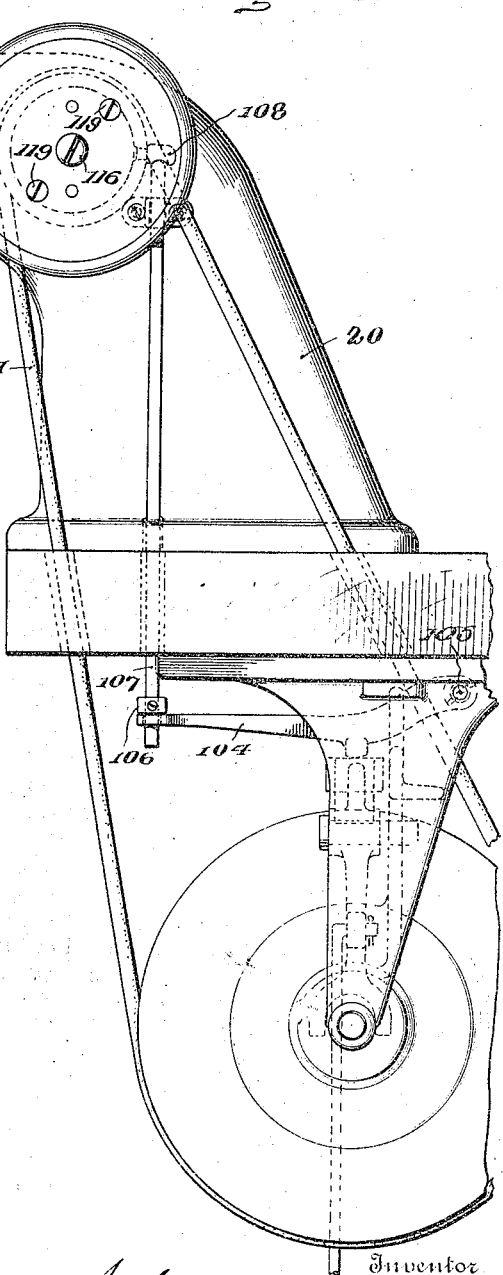

In the embodiment of the invention of Figs. 1–10, the mechanism includes power-transmitting means consisting of the loose pulley 35 adapted to make frictional engagement with and drive the hand-wheel. In the embodiment of the invention illustrated in Figs. 11–15, the power-transmitter is separated and apart from the stopping mechanism. Figs. 13 and 14 illustrate a power-transmitter of the character described and illustrated in Patent 872,481, dated Feb. 14, 1905, to Stockton Borton, including a bracket fastened to the underside of the table or bench upon which the sewing-machine is mounted. The driven pulley 100 of this power-transmitter is connected by a belt 101 to the hand-wheel 102. When the transmitter is thrown into operation by actuation of its lever 103, the upper end of the latter engages and lifts a lever 104 fulcrumed at 105. Lever 104, acting against a collar 106 fixed to rod 107, lifts the latter. Rod 107 works in a vertical opening through the machine bench and a flange at the base of the machine standard 20, and at its upper end contacts a lug 108 (corresponding to the lug 94 of the previously described embodiment of the invention) of the rotatable starting ring 109. Ring 109 will thus be rotated in the direction of the arrow, Fig. 12, which is the reverse of the direction in which the corresponding ring of the mechanism of Figs. 1–10 is rotated in starting. For this reason, the notches 110 in the ring 109 are inclined at their ends 111 (Fig. 12), instead of at their opposite ends as in the other construction, and the teeth 112 of the fixed clutch ring 113, Fig. 15, are inclined at their ends 114 instead of at their opposite ends as in said other construction. As illustrated in Fig. 11, the chamber in the hand-wheel, in which the centrifugal weight levers are mounted, is closed by a plate 115 held in place by a screw 116 threaded into an opening in the end of the main-shaft 22 and two screws 119, Fig. 14. Studs 117, 117 on the plate 115 enter the ends of the springs 118, 118 (corresponding to springs 64, 64 of the other construction) to support said springs in position. In other particulars, the parts of the mechanism illustrated in Fig. 11 are similar in construction and operation to corresponding parts illustrated in Figs. 1–10, and need not be further described in detail.

While I have herein described my invention in connection with sewing-machines, obviously, it may be used in conjunction with other machines; and, while I have described in some detail the mechanical embodiments of the invention illustrated in the drawings, it will be appreciated that the invention is not limited to the precise construction and arrangement of parts shown, since various modifications thereof may be adopted without departing from the spirit of the invention.

What is claimed is:—

1. The combination with a driven shaft, of coöperating stop-members adapted to be engaged with each other to stop the shaft; and locking means for positively locking said members against movement toward each other but adapted to automatically unlock the same when the rotation of the shaft is reduced from a relatively high speed to a predetermined lower speed.

2. The combination with a driven shaft, of coöperating stop-members adapted to be engaged with each other to stop the shaft; and locking means automatically controlled by the speed of rotation of the shaft to positively lock the stop-members against movement toward each other until the rotation of the shaft is reduced from a relatively high speed to a predetermined lower speed and to then automatically unlock the same.

3. The combination with a driven shaft, of coöperating stop-members adapted to be engaged with each other to stop the shaft; locking means automatically controlled by the speed of rotation of the shaft to positively lock the stop-members against movement toward each other until the rotation of the shaft is reduced from a relatively high speed to a predetermined lower speed and to then automatically unlock the same; and means for moving said stop-members into engagement when thus unlocked.

4. The combination with a driven shaft, of coöperating stop-members adapted to be engaged with each other to stop the shaft; and a centrifugally controlled locking device rotatable with the shaft and acting to positively lock said members against movement toward each other until a predetermined speed limit is reached, and to then automatically unlock the same.

5. The combination with a driven shaft, of coöperating stop-members adapted to be engaged with each other to stop the shaft, one of said members being relatively fixed and the other rotatable with the shaft and movable into and out of engagement with the fixed member; and a centrifugally controlled locking device also rotatable with the shaft and acting to positively lock said movable member against movement toward the fixed member until a predetermined speed limit is reached and to then automatically unlock the movable member to permit the same to be moved into engagement with the fixed member.

6. The combination with a driven shaft, of coöperating stop-members adapted to be engaged with each other to stop the shaft; a pivotal locking device for positively locking said members out of engagement, said device being rotatable with the shaft and adapted to be turned on its pivot to its locking position by the action of centrifugal force; and means acting to automatically turn said locking device to its non-locking position when a predetermined speed limit is reached.

7. The combination with a driven shaft, of a pair of coöperating stop-rings about said shaft one of said rings being relatively fixed and the other rotatable with the shaft and movable into and out of engagement with the fixed ring; a pivotal locking device for positively locking said movable ring out of engagement with the fixed ring said device being rotatable with the shaft and adapted to be turned on its pivot to its locking position by the action of centrifugal force; and means acting to automatically turn said device on its pivot to its non-locking position when a predetermined speed-limit is reached.

8. The combination with a driven shaft, of a pair of coöperating stop-rings about said shaft, one of said rings being relatively fixed and the other rotatable with the shaft and movable into and out of engagement with the fixed ring; a wheel fixed to the shaft; one or more studs secured to the movable stop-ring and each movable in an opening through the wheel; and a centrifugally controlled locking device for each stud mounted upon and rotatable with the wheel and adapted to be held by centrifugal force in locking engagement with its stud until a predetermined speed limit is reached and to be then automatically moved to release its stud and thereby permit the movable stop-ring to be moved into engagement with the fixed stop-ring.

9. The combination with a driven shaft, of a pair of coöperating stop-rings about said shaft, one of said rings being relatively fixed and the other rotatable with the shaft and movable into and out of engagement with the fixed ring; a wheel fixed to the shaft; one or more studs secured to the movable stop-ring and each movable in an opening through the wheel; a centrifugally controlled locking device for each stud mounted upon and rotatable with the wheel, and adapted to be held by centrifugal force in locking engagement with its stud until a predetermined speed limit is reached and to be then automatically moved to release its stud and thereby permit the movable stop-ring to be moved into engagement with the fixed stop-ring; and a spring for each stud located in a hollow end thereof and acting upon release of the stud to shift the movable stop-ring into engagement with the fixed stop-ring.

10. The combination of a driven shaft, two coöperating stop rings about said shaft having irregularly spaced teeth and notches for engagement with each other in stopping the shaft, one of said rings being relatively fixed and the other rotatable with the shaft and movable into and out of engagement with the fixed ring; and centrifugally controlled locking means rotatable with the shaft and acting to positively lock the movable ring against movement toward and engagement with the fixed ring until a predetermined speed limit is reached and to then automatically unlock said ring.

11. The combination of a driven shaft; a machine-frame or casing in which the shaft is journaled having a flange or hub projecting therefrom about the shaft; a pair of coöperating stop-rings about said shaft one of said rings being relatively fixed and encircling said hub and the other ring being rotatable with the shaft and movable into and out of engagement with the fixed ring; one or more buffer-springs located in an annular recess between said hub and the relatively fixed ring and against the tension of which said relatively fixed ring may make limited rotation when engaged by the rotatable ring; and centrifugally controlled means for moving the rotatable stop-ring into engagement with the relatively fixed stop-ring.

12. The combination with a driven shaft, of a pair of coöperating stop-rings about said shaft one of said rings being relatively fixed and the other rotatable with the shaft and movable into and out of engagement with the fixed ring; means for moving the movable ring into engagement with the fixed ring to stop the shaft; and a shifter-ring about the shaft acting when rotated to shift the movable stop-ring out of engagement with the fixed ring.

13. The combination with a driven shaft, of a pair of coöperating stop-rings about said shaft one of said rings being relatively fixed and the other rotatable with the shaft and movable into and out of engagement with the fixed ring; means for moving the movable ring into engagement with the fixed ring to stop the shaft; a wheel fixed to the shaft; a brake-band engaging said wheel; a shifter-ring about the shaft acting when rotated to shift the movable stop-ring out of engagement with the fixed ring; a lever connected to said shifter ring and brake band for actuating the same; and spring means acting on said lever to tighten the brake-band.

14. A speed-controlling and arresting mechanism including a rotary shaft, means for disconnecting said shaft from its source of power, and means including a speed governor for determining the speed of said shaft when acted on to discontinue its operation, in combination with means having a movement independent of the governor movement for arresting the action of said shaft in a predetermined position with respect to its rotary movements.

15. A speed-controlling and arresting mechanism including a rotary shaft and means including a speed governor for determining the speed of said shaft when acted on to discontinue its operation and means having a movement independent of the governor movement for arresting the shaft action in a predetermined position with respect to its rotary movements.

16. A speed-controlling and arresting mechanism including a rotary shaft, means for disconnecting said shaft from its source of power, and means including a speed governor for determining the speed of said shaft when acted on to discontinue its operation, and means coacting with said centrifugally controlled means and movable independently thereof for arresting the action of said shaft in a predetermined position with respect to its rotary movements.

17. A speed-controlling and arresting mechanism including a main-shaft operatively connected with the source of power, means for effecting and for discontinuing the transmission of said power, a speed governor, a brake-disk provided with a stop member carried by said shaft and movable independently of the speed governor but controlled thereby to determine the speed of said shaft when acted on to discontinue its operation, and means mounted on the machine frame and coacting with said stop member when the latter is moved to arrest the action of said shaft in a predetermined position with respect to its rotary movements.

18. A speed-controlling and arresting mechanism including a main-shaft operatively connected with the source of power, means for effecting and for discontinuing the transmission of said power, a speed governor, a brake-disk provided with a stop member carried by said shaft and movable independently of the speed governor but controlled thereby to determine the speed of said shaft when acted on to discontinue its operation, and means mounted on the machine frame including a resistance member coacting with said stop member to arrest the action of said shaft in a predetermined position with respect to its rotary movements.

19. A speed-controlling and arresting mechanism including a main-shaft operatively connected with the source of power, means for effecting and discontinuing the transmission of said power, a brake-disk provided with a stop member carried by said shaft, a speed governor mounted on said shaft and acting on said brake-disk to determine the speed of said shaft when acted on to discontinue its operation, and means carried by the machine frame and coacting with said stop member to arrest the action of said shaft in a predetermined position with respect to its rotary movements.

20. A speed-controlling and arresting mechanism including a main-shaft operatively connected with the source of power, means for effecting and discontinuing the transmission of said power, a brake-disk provided with a stop member carried by said shaft, a speed governor mounted on said shaft and acting on said brake-disk to determine the speed of said shaft when acted on to discontinue its operation, and means acting on said brake-disk to force said stop member into engagement with a resistance member carried by the machine frame to arrest the action of said shaft in a predetermined position with respect to its rotary movements.

21. In a speed-controlling and arresting mechanism, a main-shaft operatively connected with the source of power, means for effecting and discontinuing the transmission of said power including a driving pulley, a driven pulley and a brake-device, said brake-device coacting with said driven pulley to reduce the speed of the latter when released from engagement with said driving pulley, a speed governor, a brake-disk provided with a stop member carried by said shaft and controlled by the speed governor to determine the speed of said shaft when acted on to discontinue its operation, and means connected with the machine frame and coacting with said stop member to arrest the action of said shaft in a predetermined position with respect to its rotary movements.

22. A speed-controlling and arresting mechanism including a main-shaft operatively connected with the source of power, means for effecting and discontinuing the transmission of said power, a speed governor, a brake-disk provided with a stop member carried by said shaft and controlled by the speed governor to determine the speed of said shaft when acted on to discontinue its operation, and a stop disk secured to the machine frame and provided with a yieldingly mounted resistance member, which latter coacts with said stop member to arrest the action of said shaft in a predetermined position with respect to its rotary movements.

23. In a speed-controlling and arresting mechanism, a main-shaft, a power transmitter operatively connected with said shaft and the source of power, manually controlled means operatively connected with said power transmitter for effecting and discontinuing the transmission of power, a speed governor, a brake-disk provided with a stop member carried by said shaft and controlled by the speed governor to determine the speed of said shaft when acted on to discontinue its operation, and a resistance member connected with the machine frame and coacting with said stop member to arrest the action of said shaft in a predetermined position with respect to its rotary movements.

24. In a speed controlling and arresting mechanism, a main-shaft, a power-transmitter operatively connected with said main-shaft and with the source of power, a manually operated treadle connected with said transmitter acting, at the will of the operator, to effect or to discontinue the transmission of power, a speed governor, a brake-disk provided with a stop member carried by said shaft and controlled by the speed governor to determine the speed of said shaft when acted on to discontinue its operation, a resistance member connected with the machine frame and coacting with said stop member to arrest the action of said shaft in a predetermined position with respect to its rotary movements, and connections between said brake-disk and said treadle including an expanding member for releasing said stop member from engagement with said resistance member.

25. The combination of a driven shaft, driving means therefor, means for interrupting the action of the driving means, a toothed locking device for the shaft inactive when the shaft is rotating at a relatively high speed, means for throwing the toothed locking device into action, and means for automatically holding the last said means out of operation when the shaft is rotating at the said high speed and for automatically bringing it suddenly into operation upon the diminution of speed of rotation of the shaft to a predetermined relatively lower speed.

26. The combination of a driven shaft, driving means therefor, means for interrupting the action of the driving means, a toothed locking device for the shaft, a centrifugal mechanism, means for throwing the toothed locking device into action, and a means supplemental to the centrifugal mechanism but controlled thereby to positively hold the last said means out of operation when the shaft is rotating at a relatively high speed and to automatically bring it suddenly into operation upon the diminution of speed of rotation of the shaft to a predetermined relatively lower speed.

In testimony whereof I have signed this specification in the presence of two subscribing witnesses.

ARTHUR A. MERRITT.

Witnesses:
 RUTH C. FITZHUGH,
 W. B. MERKAM.